UNITED STATES PATENT OFFICE.

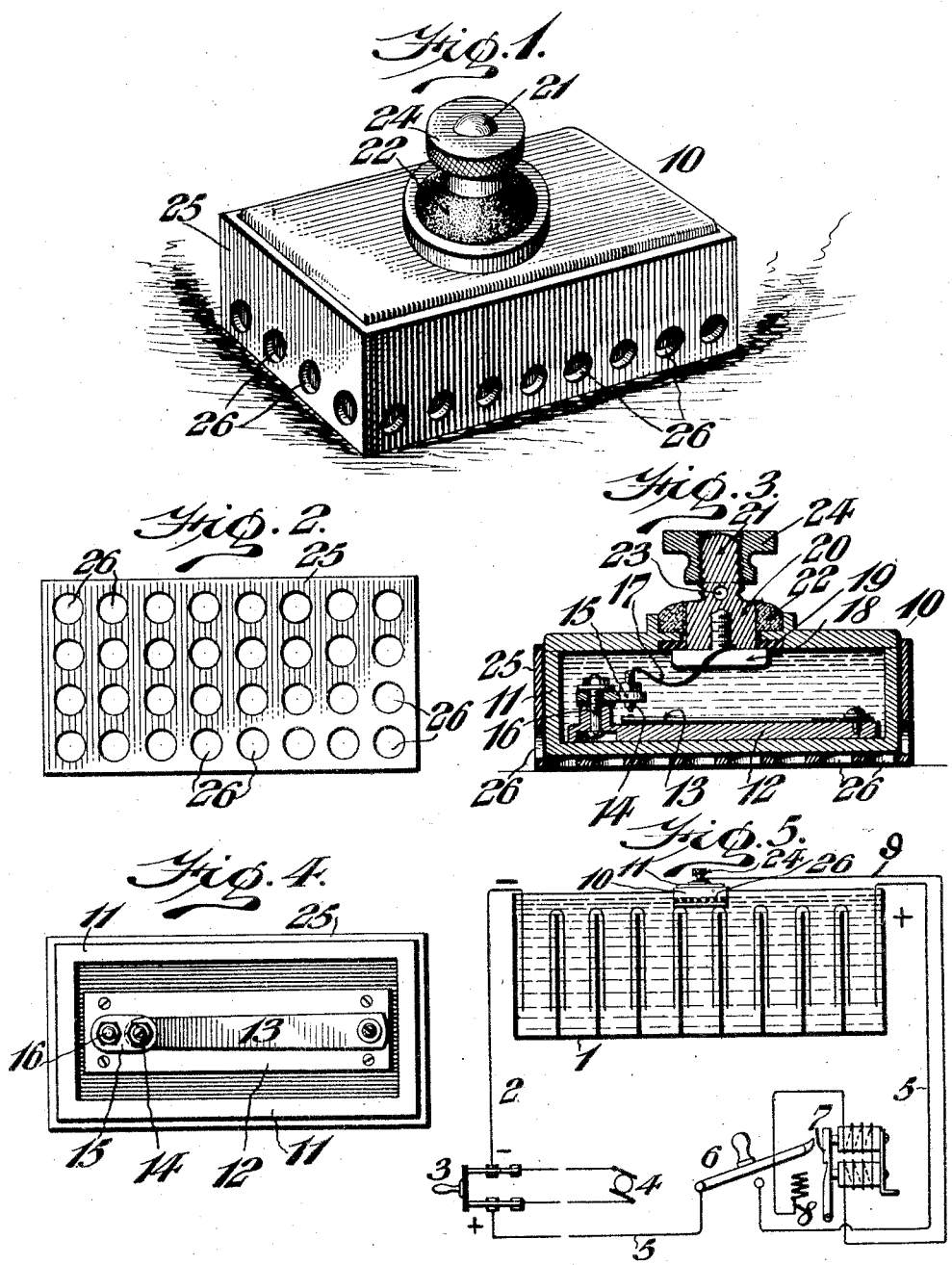

FREDERICK W. SCHMIDT, OF PHILADELPHIA, PENNSYLVANIA.

CONTROL FOR CHARGING STORAGE BATTERIES.

976,748.

Specification of Letters Patent.   Patented Nov. 22, 1910.

Application filed May 4, 1910.   Serial No. 559,286.

*To all whom it may concern:*

Be it known that I, FREDERICK W. SCHMIDT, a citizen of the United States, residing in the city and county of Philadelphia, State of Pennsylvania, have invented a new and useful Control for Charging Storage Batteries, of which the following is a specification.

My invention consists of an improved device for cutting out the charging circuit in charging storage batteries at the rise of temperature in the same beyond a predetermined point.

It further consists of an improved thermostat for such controlling device.

It further consists of other novel features of construction, all as will be hereinafter fully set forth.

For the purpose of illustrating my invention I have shown in the accompanying drawing one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described but I desire to make such changes as will come within the scope of my invention.

Figure 1 represents a perspective view of my improved thermostat. Fig. 2 represents a bottom plan view of the same. Fig. 3 represents a longitudinal section of the thermostat. Fig. 4 represents a top plan view of the same with the cover removed. Fig. 5 is a diagrammatical representation of a charging circuit, a storage battery and an automatic cut-out to which the thermostat is applied.

Similar numerals of reference indicate corresponding parts in the figures.

Referring to the drawings: The present invention is an improvement upon the invention disclosed in my co-pending application, Serial No. 537,803, filed Jan. 13, 1910, for battery temperature controller. Said latter consists essentially in a thermostatic device immersed in a storage battery during charging of the same and constructed to actuate a cut-out device in the charging circuit to cut out the battery when the temperature in the same rises beyond a predetermined point. This thermostat has a metallic but acid-resisting casing which usually contacts with one of the elements in the battery. By carelessness of an attendant, however, or from other accident, a short-circuit may be made in the battery through this casing, and one feature of my present device is directed toward avoiding such possibility.

In the diagram, Fig. 5, the battery to be charged is indicated by the numeral 1, having one conductor, 2, leading through a switch, 3, from one terminal of a generator, 4, and another conductor, 5, connected to the other terminal of the generator. This comprises the charging circuit. An automatic circuit breaker, in the present instance disclosed as a knife-switch, 6, is connected in the circuit and closes the same when the blade of the switch engages its terminals and is so held by a trigger which forms a part of or is connected to the armature of an electro-magnet, these parts forming a holding and releasing device, 7, for the circuit-breaker. The electro-magnet is wound in a branch or shunt circuit, one terminal, 8, of which is connected to the charging circuit through the circuit breaker, while its other terminal, 9, is connected to one contact member of the thermostat 10, which is immersed in the battery solution, when the device is in operation. All of these elements and connections are substantially the same as those disclosed in my above referred to application, and need not be specifically described.

The thermostat has a casing, 11, of lead or other acid-resisting metal, and a plate, 12, is secured to the bottom of this casing and in electric contact with the same. A composite strip, 13, such as usually employed in thermostats, is secured to this plate and will contact, when flexed by rise of temperature, with a contact-screw, 14, in an arm 15, secured upon but insulated from a screw-post, 16, upon the base plate 12. The contact-screw is connected by a wire, 17, to a screw, 18, which is insulated from the cover of the casing by means of an insulating washer, 19, and projects outward through an opening in the cover. The enlarged base, 20, of a screw-post, 21, of lead or similar acid-resisting metal is secured upon the screw, and is insulated from the cover by an insulating filling, 22, also closing the opening in the cover. The screw-post 21 has a transverse hole, 23, through which the wire terminal of the branch or shunt circuit can be inserted and secured by a nut, 24, preferably of hard rubber or other acid-resisting and non-conducting material. The casing is tightly closed by its cover which is soldered or fused on, and its interior is completely filled with a heat-conducting but insulating liquid, such as transformer oil or similar oil, which will maintain insulation of the parts within the casing, conduct heat from the walls of the casing to the thermostat strip, and prevent the formation of an arc between the contact points and thus preserve the same from burning or fusing. The casing fits within an apertured insulating jacket, 25, of hard rubber or other insulating material, which will prevent metallic contact of the casing with the battery elements and at the same time give free conductive access for the solution to the surface of the casing. The apertures 26 of the jacket will permit the solution to act against all sides of the casing to convey a part of the battery-current to the same, but the jacket will prevent direct metallic contact of the casing with the elements of the battery and thus prevent short-circuiting by accidental contact of the casing with two elements.

When charging a battery, the terminals of the charging circuit, which has been closed at the main switch 3 and circuit-breaker, are connected to the binding posts or similar terminals of the battery, and the current from the generator will thus charge the battery. The thermostat, which is connected to one terminal of the shunt circuit, is placed in the battery, immersed in the solution. If, during the charging of the battery, the temperature in the latter rises above a predetermined degree,—usually about 105° Fahrenheit,—to which the thermostat has been adjusted to close contact, the contacts close the shunt-circuit through the same, as the casing of the thermostat forms a terminal in the battery and thus diverts a portion of the circuit flowing through the battery, to the shunt circuit. This will energize the electro-magnet in the shunt-circuit and cause the latter to attract its armature and release the circuit-breaker which will thus cut out the battery from the charging circuit and prevent damage from overheating and overcharging. All of this operation is substantially like in the device of my other application, above referred to, excepting in so far as the thermostat casing, or as much thereof as is metallic, is therein disclosed as in contact with a battery element, while in the present device, the shunt circuit derives its connection in the battery circuit by the thermostat casing forming a terminal of the shunt circuit in the battery without direct contact, in fact, being insulated from such contact by its jacket, but deriving its current when the contact of the thermostat is closed through the battery solution which carries the current.

As the charging of the storage batteries of electric vehicles is usually in the hands of more or less unskilled attendants, it is of importance to provide against accidental short-circuiting of the battery by accidental contact through the thermostat casing when the latter is placed or dropped into the battery solution, and this provision is furnished by inclosing the casing in its insulating jacket, and making the thermostat casing a terminal of the shunt circuit in the battery, active only when the contacts within it close by rise of temperature. At other times, of course, the casing is inert.

Having thus described my invention, what I claim as new and desire to secure by Letters Patent, is:

In a device of the character stated, a thermostat having an electrically conducting acid-resisting metallic casing, and an apertured insulating jacket inclosing such casing.

FREDERICK W. SCHMIDT.

Witnesses:
C. D. McVay,
M. E. Rinkenbach.